(No Model.) 2 Sheets—Sheet 1.
W. P. CANNING.
STOP MOTION MECHANISM FOR MACHINES FOR PREPARING SLIVERS.
No. 551,028. Patented Dec. 10, 1895.
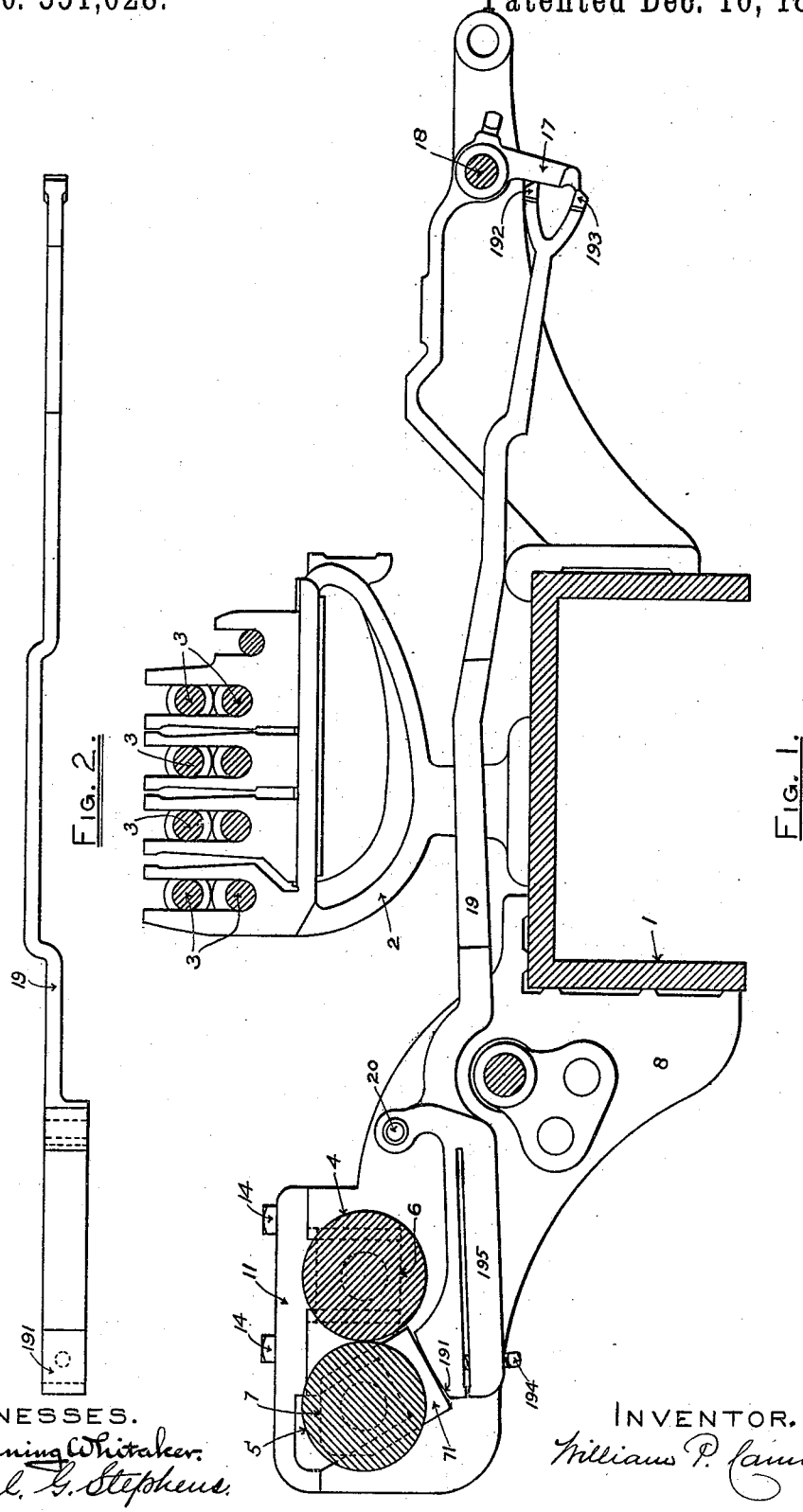
WITNESSES.
Channing Whitaker.
Saml. G. Stephens.
INVENTOR.
Williams P. Canning.

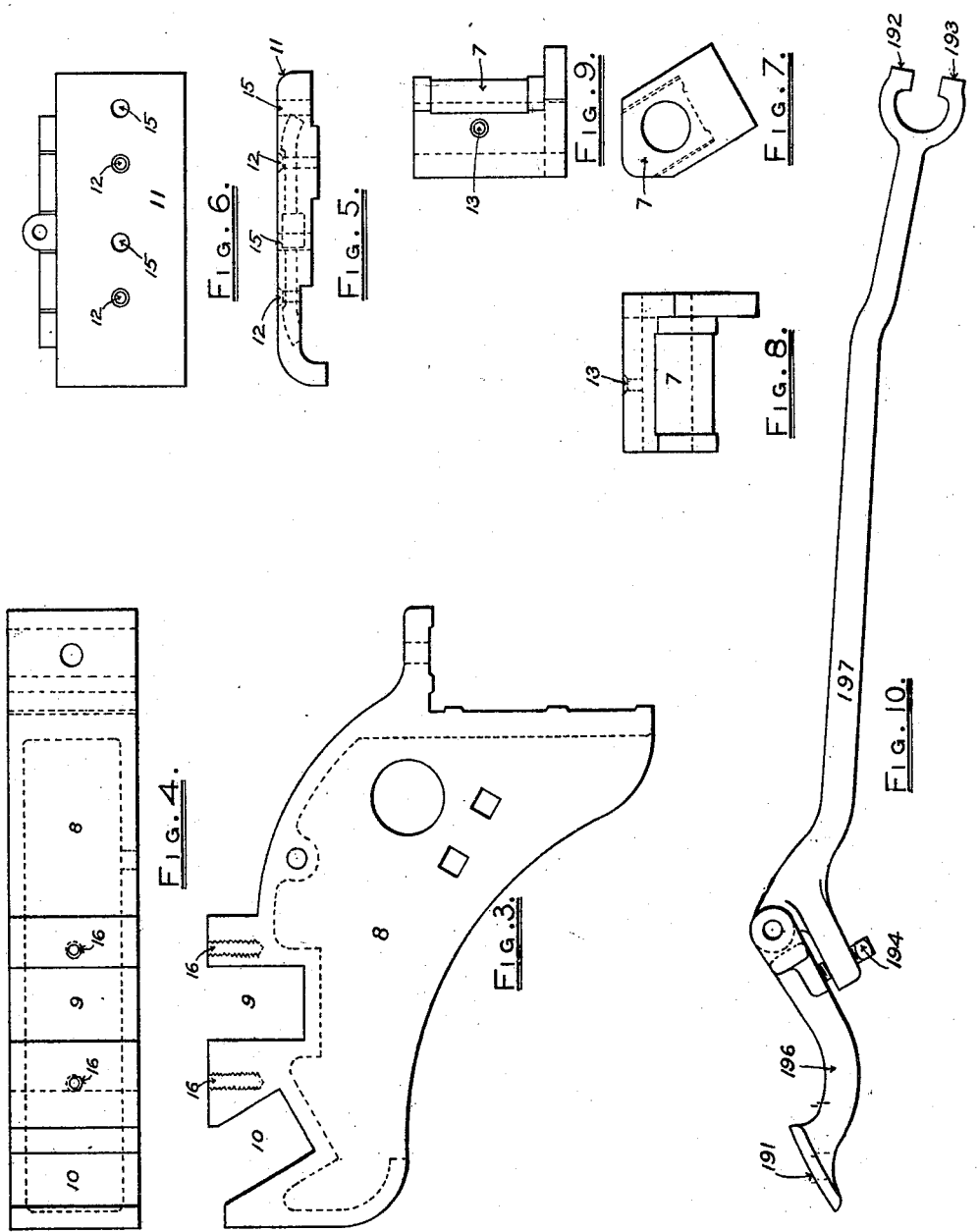

UNITED STATES PATENT OFFICE.

WILLIAM P. CANNING, OF LOWELL, MASSACHUSETTS, ASSIGNOR TO THE LOWELL MACHINE SHOP, OF SAME PLACE.

STOP-MOTION MECHANISM FOR MACHINES FOR PREPARING SLIVERS.

SPECIFICATION forming part of Letters Patent No. 551,028, dated December 10, 1895.

Application filed May 10, 1895. Serial No. 548,813. (No model.)

*To all whom it may concern:*

Be it known that I, WILLIAM PITT CANNING, a citizen of the United States, residing at Lowell, in the county of Middlesex and Commonwealth of Massachusetts, have invented certain new and useful Improvements in Stop-Motion Mechanisms for Machines for Preparing Slivers, of which the following is a specification, reference being had therein to the accompanying drawings.

The invention relates to stop-motion mechanisms for machines for preparing slivers, more particularly those stop-motion mechanisms which are employed in connection with the calender-rolls of such machines.

It has for its object to provide a stop-motion mechanism of novel, improved, and convenient construction, character, and arrangement, which shall act whenever the sliver passing between the calender-rolls laps or winds around either or both of the said rolls, and also whenever the said sliver presents an undue enlargement, becomes unduly attenuated, breaks, or runs out.

The invention first is described fully in the following specification with reference to the accompanying drawings, in which latter is represented the best embodiment thereof for practical use which I have yet devised, after which the various characteristic features thereof are particularly pointed out, and distinctly defined in the claims at the close of this specification.

In the drawings, Figure 1, Sheet 1, is a view in transverse section of a drawing-frame having applied thereto the preferred embodiment of my invention. Fig. 2, Sheet 1, is a view showing in plan the form of stop-motion lever that is represented in Fig. 1. Figs. 3 and 4, Sheet 2, are views showing in side elevation and in plan, respectively, one of the stands which receive the bearings for the calender-rolls. Figs. 5 and 6, Sheet 2, are similar views of the cap for the said stand. Figs. 7, 8, and 9, Sheet 2, are views showing in end elevation, side elevation, and plan, respectively, one of the movable bearings for one of the calender-rolls. Fig. 10, Sheet 2, shows a modified form of stop-motion lever.

1 designates part of the framework of a drawing-frame.

2 is one of the stands which support the drawing-rollers.

3 3 are the drawing-rollers.

4 5 are the calender-rolls, the same being located at a suitable distance from the drawing-rollers, and the axes of both calender-rolls being in the same horizontal plane, as usual in practice.

6 is the bearing for the journal at one end of the roll 4.

7 is the bearing for the journal at one end of the roll 5. Its form is shown most clearly in Figs. 7, 8, and 9, Sheet 2.

8 is the stand which supports the said bearings 6 and 7. It is shown separately in Figs. 3 and 4, Sheet 2. 9 is a recess in the said stand 8, it having vertical sides and receiving the bearing 6. 10 is a second recess in the said stand 8, it having sides which are inclined from a vertical position and receiving the bearing 7.

11 is the cap which covers the recesses 9 and 10 and retains the bearings 6 and 7 in such recesses. Its form is shown most clearly in Figs. 5 and 6, Sheet 2.

12 12 are oil-holes in the cap 11, these registering in position with similar holes in the bearings 6 and 7, one of the latter holes being indicated at 13 in Figs. 8 and 9, Sheet 2.

14 14 are screws, which are passed through holes 15 15 in the cap and into threaded holes 16 16 in the stand and serve to secure the said cap to the said stand.

17 is a striker.

18 is the shaft on which the said striker is made fast.

The foregoing parts are or may be all as usual or as desired.

As usual, the striker-shaft 18 is in practice connected with devices of well-known character, whereby said shaft and the striker are oscillated or vibrated, the said devices forming part of or being associated with means for tripping or otherwise shifting or shipping the driving connections, the whole operating when the movement of the striker is obstructed to cause the stoppage of the machine. Inasmuch as all these things are of well-known character and operation and as many forms thereof are in common use, I have deemed it unnecessary to show any parts beyond the striker-shaft 18.

19 is the part or device which is intended at certain times in the working of the drawing-frame to interpose itself as an obstacle in the path of movement of the striker 17, to thereby arrest the movement of the striker and its shaft 18 and occasion the stoppage of the drawing-frame. The said part 19 is termed hereinafter the "stop-motion lever." It is pivoted at 20, for convenience, to the stand 8, and one arm thereof extends rearwardly into proximity to the striker 17, while the other arm extends forward beneath the position of the calender-rolls 4 and 5. The said stop-motion lever 19 is intended to swing in unison with any changes which may take place in the position of the roll 5, and it may be formed and arranged so that its forward end will bear against the under side of the journal of the said roll. Preferably, however, on account of the wear which would result from the foregoing contact of the lever with the said roll, the forward arm of lever 19 is arranged to engage with the bearing 7, the latter being formed with a flange or lip 71, which is in contact with the convex surface 191 on the said forward arm. The rearward arm of the stop-motion lever is enough heavier than the forward arm to overbalance the latter and maintain the convex surface 191 pressed against the edge of the flange or lip 71. Hence as roll 5 and its bearing 7 move in the slot 10, in consequence of variations in the thickness of the sliver passing between rolls 4 and 5, the stop-motion lever 19 vibrates in unison with such movement. When the said thickness increases, the roll 5 and bearing 7 will move upwardly or rise in the inclined recess 10, according as the increase of thickness forces roll 5 away from roll 4, and when the thickness decreases the said roll and bearing will move downwardly or descend in the said recess, according as the decrease of thickness permits roll 5 to approach roll 4.

It is preferred to arrange for arresting the action of the drawing-frame whenever roll 5 moves beyond a certain point in either direction. To this end I have equipped the rearward arm of the stop-motion lever with two striker-engaging portions 192 and 193. These are separated from each other sufficiently to permit the engaging portion of striker 17 to play freely between them without engagement with either thereof so long as the lever remains in approximately the middle position, which will be the case so long as the sliver passing between the calender-rolls 4 and 5 does not vary materially from the desired size. When, however, the stop-motion lever is carried into either of its extreme positions, one or the other of the said striker-engaging portions 192 193 will come into the path of movement of the engaging portion of the strike and arrest the movement of the striker. One of the said extreme positions of the stop-motion lever will be assumed thereby in case of either a wind-up or lap on the calender-rolls or an undesirable increase in the size of the sliver, and the other extreme position of the said lever will be assumed thereby whenever the sliver breaks or becomes undesirably attenuated.

With the object in view of enabling the time of the engagement of the striker with the stop-motion lever to be regulated, I provide means for effecting an angular adjustment of the striker-engaging portion of the said lever relatively to the striker. In other words, I provide means for adjusting the said portion of the lever crosswise of the path of movement of the striker. As will be obvious, this adjustment might be effected without departure from the principle of my invention by making the rearward arm or a fixture thereof adjustable in the direction stated relatively to the remainder of the lever. Owing, however, to the comparative inaccessibility of such rearward arm and the inconvenience of making adjustment in such case, I prefer to apply the provisions for adjustment to the forward arm of the lever, which arm is readily accessible to the operator in charge of the machine. To this end I preferably provide the stop-motion lever with a forward arm, which is made capable of movement relatively to the remainder of the lever, and I adjust the same angularly by means of a set-screw or the like device.

Figs. 1 and 2 show a form of stop-motion lever in which the arm which engages with the lip 71 of the bearing 7 is formed integral with the remainder of the lever, but is sufficiently thin in the portion thereof to the rear of the convex surface 191 to enable it to be sprung or deflected. A set-screw 194, passing through a threaded hole in a heavier part 195 of the stop-motion lever and bearing at its inner end against the said flexible arm, serves as a convenient means of deflecting or springing the said flexible arm to the extent which is desired.

Fig. 10 shows a form of lever in which a forward arm 196 is made a separate piece from the rearward arm 197, the two arms being mounted upon the same pivot-pin, the set-screw 194 being illustrated as applied to a threaded hole in a projecting portion of arm 197 and bearing by its inner end against the arm 196. As will be obvious, viewing this portion of my invention in its broadest aspect, it is not material where the adjustment is provided in the stop-motion lever, inasmuch as so long as the forward arm of the said lever rests in contact with the roll 5 or its bearing the result of operating the adjusting devices will be to vary the position of the striker-engaging portion of the stop-motion lever crosswise of the path of movement of the striker, and thereby will regulate the engagement of the striker with such portion of the lever.

I claim as my invention—

1. The combination with the roll 4, the roll 5 moving in accordance with variations in the thickness of the material between said rolls, the stop-motion lever caused to swing by changes in the position of roll 5, and the striker, of means to effect an adjustment of the striker-engaging portion of said lever cross-wise of the path of movement of the striker, to thereby regulate the engagement of the striker with the lever, substantially as described.

2. The combination with the roll 4, the roll 5 moving in accordance with variations in the thickness of the material between said rolls, and the striker, of the stop-motion lever caused to swing by changes in the position of roll 5 and provided with a movable arm having means to adjust the same angularly, whereby to regulate the engagement of the striker with the said lever, substantially as described.

3. The combination with the roll 4, the roll 5 moving in accordance with variations in the thickness of the material between said rolls, and the striker, of the stop-motion lever caused to swing by changes in the position of roll 5 and provided with the arm integrally united therewith, and means to spring or deflect said arm, whereby to regulate the engagement of the striker with the said lever, substantially as described.

4. The combination with the roll 4, the roll 5 moving in accordance with variations in the thickness of the material between said rolls, and the striker, of the stop-motion lever caused to swing by changes in the position of roll 5 and provided with the arm integrally united therewith, and the adjusting screw whereby to spring or deflect said arm, and regulate the engagement of the striker with the said lever, substantially as described.

In testimony whereof I affix my signature in the presence of two witnesses.

WILLIAM P. CANNING.

Witnesses:
SAML. G. STEPHENS,
MARY CAVERLY.